United States Patent
Shah et al.

(10) Patent No.: US 10,467,306 B2
(45) Date of Patent: Nov. 5, 2019

(54) METHOD AND SYSTEM FOR USER AUTHORIZATION BASED INFORMATION SEARCH AND ACCESS

(71) Applicant: Tata Consultancy Services Limited, Mumbai (IN)

(72) Inventors: Viral Prakash Shah, Mumbai (IN); Gaurav Singh, Mumbai (IN); Aakash Khandelwal, Mumbai (IN); Sourabh Sanyal, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/062,917

(22) Filed: Mar. 7, 2016

(65) Prior Publication Data

US 2017/0169116 A1 Jun. 15, 2017

(30) Foreign Application Priority Data

Dec. 9, 2015 (IN) .......................... 4649/MUM/2015

(51) Int. Cl.
*G06F 21/00* (2013.01)
*G06F 16/9535* (2019.01)
*G06F 16/248* (2019.01)
*G06F 21/62* (2013.01)
*G06Q 10/06* (2012.01)
*H04L 29/06* (2006.01)

(52) U.S. Cl.
CPC ........ *G06F 16/9535* (2019.01); *G06F 16/248* (2019.01); *G06F 21/6218* (2013.01); *G06Q 10/06* (2013.01); *H04L 63/06* (2013.01); *H04L 63/102* (2013.01)

(58) Field of Classification Search
CPC ........ G06F 17/30867; G06F 17/30554; G06F 21/6218; G06Q 10/06; H04L 63/06; H04L 63/102
USPC ........................................................... 726/4
See application file for complete search history.

(56) References Cited

U.S. PATENT DOCUMENTS

| | | |
|---|---|---|
| 7,991,788 B2 * | 8/2011 | Dettinger ............ G06F 17/3056 707/783 |
| 8,027,976 B1 | 9/2011 | Ding et al. |
| 2007/0208744 A1 * | 9/2007 | Krishnaprasad .... G06F 21/6227 |
| 2009/0089246 A1 * | 4/2009 | Chi .................... G06F 17/30705 |
| 2010/0042602 A1 * | 2/2010 | Smyros ............. G06F 17/30091 707/711 |
| 2014/0365527 A1 | 12/2014 | Fuchs et al. |

* cited by examiner

*Primary Examiner* — Alexander Lagor
(74) *Attorney, Agent, or Firm* — Finnegan, Henderson, Farabow, Garrett & Dunner LLP

(57) ABSTRACT

A method and system is provided for user authorization based information search and access. The present application provides a bandwidth efficient method and system for searching and accessing information based on a user authorization within an enterprise resource planning (ERP) environment by authorizing the user for searching and accessing the information containing authorization key ingrained therein without compromising speed of searching, comprises inputting user defined search query for information within the enterprise resource planning environment; forming user defined search query by incorporating authorization information of the user therein; searching a plurality of indexes for information; extracting search results from the plurality of indexes; and displaying the extracted search results.

10 Claims, 2 Drawing Sheets

METHOD AND SYSTEM FOR USER AUTHORIZATION BASED INFORMATION SEARCH AND ACCESS

PRIORITY CLAIM

This U.S. patent application claims priority under 35 U.S.C. § 119 to India Application No. 4649/MUM/2015, filed on Dec. 9, 2015. The entire contents of the aforementioned application are incorporated herein by reference.

TECHNICAL FIELD

The present application generally relates to user authorization based information search and access. Particularly, the application provides a bandwidth efficient method and system for searching and accessing information based on a user authorization within an enterprise resource planning (ERP) environment.

BACKGROUND

An enterprise resource planning (ERP) is one of the foundation tool used by organizations for managing their businesses. Enterprise resource planning, essentially integrate collection of applications for collecting, storing, managing and interpreting data from many business activities pertaining to a given organization, wherein the business activities may range from production planning, cost planning, manufacturing, service delivery, sales and marketing of services or products, inventory management, shipping, payment etc. The enterprise resource planning (ERP) provides integrative source of information pertaining to a given organization, thereby effective and efficient storage, management, and retrieval of information becomes all the more critical.

A majority of existing solutions relies on searching and accessing individual segments of information within the enterprise resource planning (ERP) system. However, prior art literature has never explored the integrative approach for conducting search and accessing information within the enterprise resource planning (ERP) system wherein information may comprise but not limited to applications, transactions, users, documents pertaining to a given organization.

Prior art literature illustrating searching and accessing individual segments of information within the enterprise resource planning (ERP) system also requires multiple step, while reaching for required search result. However, none of the prior art literature enables users to search and access information within the enterprise resource planning environment in a single step while optimizing computational resources and network bandwidth, without compromising speed of search.

Some of the prior art literature describe about searching and accessing information based on user authorization within the enterprise resource planning (ERP) environment. However, such prior art literature is silent on authorizing the user for searching and accessing the information while optimizing computational resources and network bandwidth, without compromising speed of search.

Prior art literature have illustrated searching and accessing information based on user authorization within the enterprise resource planning (ERP) environment, however, a bandwidth efficient method and system for searching and accessing information based on a user authorization within an enterprise resource planning (ERP) environment in a single step, by authorizing the user for searching and accessing the information containing authorization key ingrained therein without compromising speed of searching is still considered as one of the biggest challenges of the technical domain.

OBJECTIVES OF THE INVENTION

In accordance with the present invention, the primary objective is to provide a bandwidth efficient method and system for searching and accessing information based on a user authorization within an enterprise resource planning (ERP) environment.

Another objective of the invention is to provide a bandwidth efficient method and system for searching and accessing information based on a user authorization within an enterprise resource planning (ERP) environment by authorizing the user for searching and accessing the information containing authorization key ingrained therein.

Another objective of the invention is to provide a bandwidth efficient method and system for searching and accessing information based on a user authorization within an enterprise resource planning (ERP) environment by authorizing the user for searching and accessing the information containing authorization key ingrained therein without compromising speed of searching.

Another objective of the invention is to provide a bandwidth efficient method and system for enabling a user to search and access information within the enterprise resource planning environment in a single step.

Other objects and advantages of the present invention will be more apparent from the following description when read in conjunction with the accompanying figures, which are not intended to limit the scope of the present disclosure.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a bandwidth efficient method and system searching and accessing information based on a user authorization within an enterprise resource planning (ERP) environment.

The present application provides a bandwidth efficient method for searching and accessing information based on a user authorization within an enterprise resource planning (ERP) environment (202) accessible through and communicatively coupled with an integrated user interface (206), characterized by authorizing the user for searching and accessing the information containing authorization key ingrained therein without compromising speed of searching. The method for searching and accessing information based on the user authorization within the enterprise resource planning (ERP) environment (202) comprising processor implemented steps of inputting user defined search query for information within the enterprise resource planning environment (202) using a search query input module (302); forming user defined search query by incorporating authorization information of the user therein using a search query formation module (304); searching a plurality of indexes (204) for information using formed user defined search query and user authorization information within the enterprise resource planning environment (202) using an information search module (306); extracting search results from the plurality of indexes (204) based on the user defined search query and user authorization information using an information extraction module (308); and displaying the extracted search results along with a synopsis of the search results to the user based on user authorization using an information display module (310).

The present application provides a system (200) for searching and accessing information based on a user authorization; characterized by authorizing the user for searching and accessing the information containing authorization key ingrained therein without compromising speed of search. The system (200) for searching and accessing information based on the user authorization comprising a processor; a data bus coupled to said processor an enterprise resource planning (ERP) environment (202) accessible through and communicatively coupled with an integrated user interface (206), enabling searching and accessing information based on the user authorization within said enterprise resource planning environment (202); a plurality of indexes (204) adapted for hosting information pertaining to said enterprise resource planning environment (202); a search history repository (208) accessible through the integrated user interface (206) and communicatively coupled with the enterprise resource planning environment (202); a computer-usable medium embodying computer code, said computer-usable medium being coupled to said data bus, said computer program code comprising instructions executable by said processor and configured for operating a search query input module (302) adapted for inputting user defined search query for information within the enterprise resource planning environment (202); a search query formation module (304) adapted for forming user defined search query by incorporating authorization information of the user therein; an information search module (306) adapted for searching the plurality of indexes (204) for information using formed user defined search query and user authorization information within the enterprise resource planning environment (202); an information extraction module (308) adapted for extracting search results from the plurality of indexes (204) based on the user defined search query and user authorization information; and an information display module (310) adapted for displaying the extracted search results along with a synopsis of the search results to the user based on user authorization.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION OF THE INVENTION

Exemplary embodiments are described with reference to the accompanying drawings, in the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present application provides a computer implemented bandwidth efficient method and system searching and accessing information based on a user authorization within an enterprise resource planning (ERP) environment. The bandwidth efficient method and system for searching and accessing information based on the user authorization within the enterprise resource planning (ERP) environment, which is characterized by authorizing the user for searching and accessing the information containing authorization key ingrained therein without compromising speed of searching.

Figure 1:
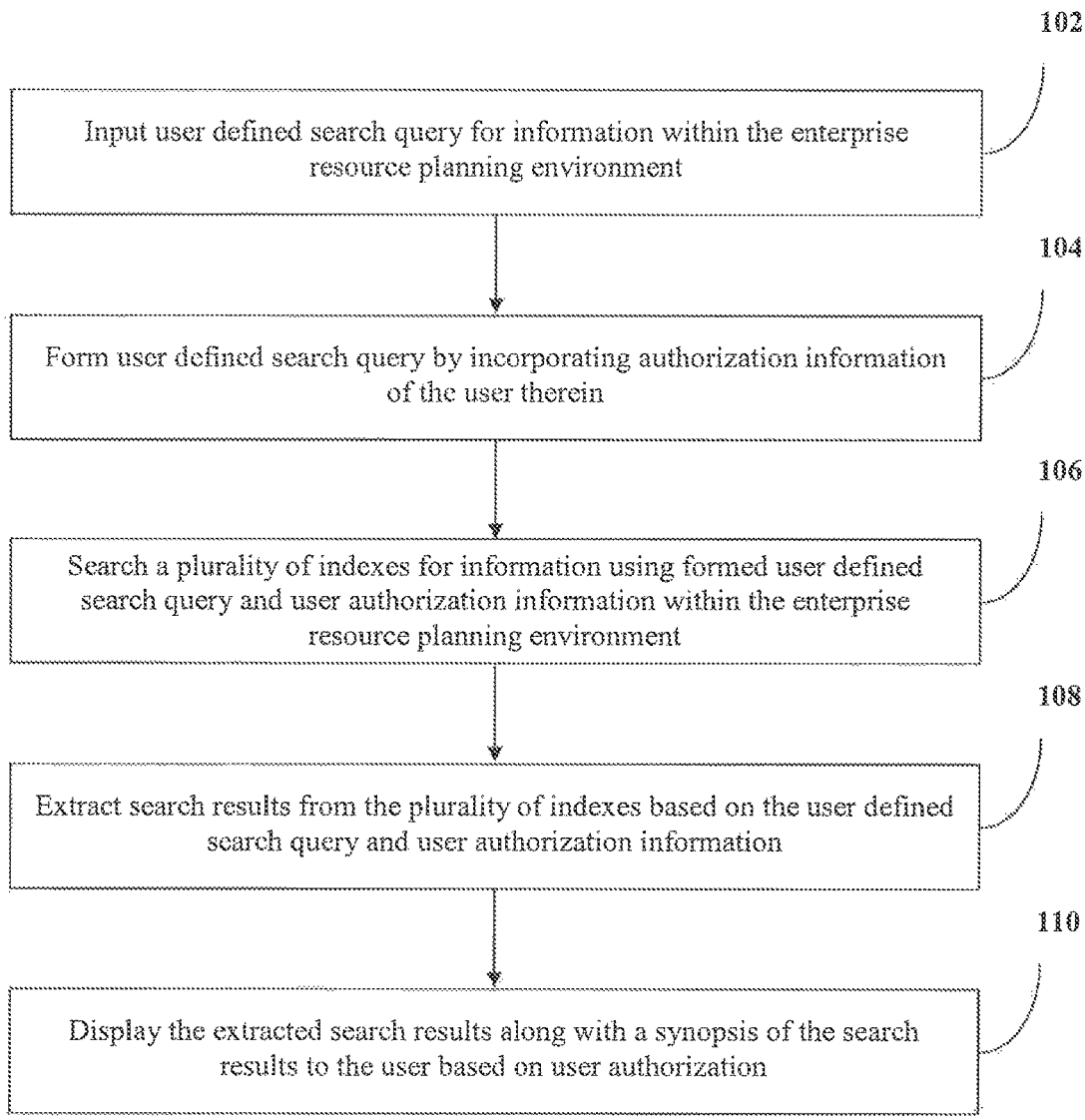
FIG. 1: shows a flow chart illustrating a method for searching and accessing information based on a user authorization within an enterprise resource planning (ERP) environment.

Referring to FIG. 1 is a flow chart illustrating a method for searching and accessing information based on a user authorization within an enterprise resource planning (ERP) environment.

The process starts at step 102, user defined search query is inputted for information within the enterprise resource planning environment. At the step 104, user defined search query is formed by incorporating authorization information of the user therein. At the step 106, a plurality of indexes are searched for information using formed user defined search query and user authorization information within the enterprise resource planning environment. At the step 108, search results are extracted from the plurality of indexes based on the user defined search query and user authorization information. The process ends at the step 110, the extracted search results displayed along with a synopsis of the search results to the user based on user authorization.

Figure 2:
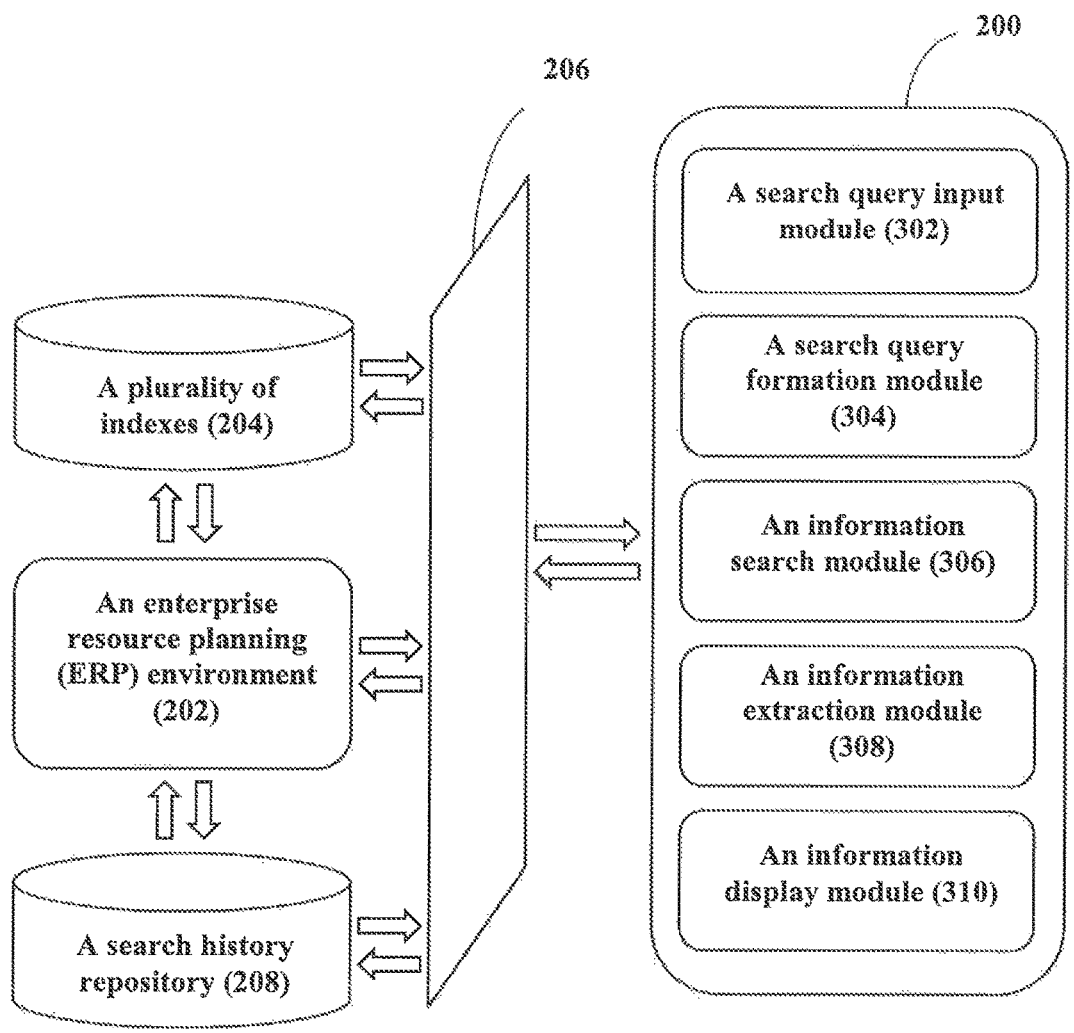
FIG. 2: shows a block diagram illustrating system architecture for searching and accessing information based on a user authorization within an enterprise resource planning (ERP) environment.

Referring to FIG. 2 is a block diagram illustrating system architecture for searching and accessing information based on a user authorization within an enterprise resource planning (ERP) environment.

In an embodiment of the present invention, a bandwidth efficient system (200) is provided for searching and accessing information based on a user authorization within an enterprise resource planning (ERP) environment (202). The system (200) is characterized by authorizing the user for searching and accessing the information containing authorization key ingrained therein without compromising speed of search. The system (200) for searching and accessing information based on the user authorization comprising a processor; a data bus coupled to said processor; the enterprise resource planning (ERP) environment (202) accessible through and communicatively coupled with an integrated user interface (206), enabling searching and accessing information based on the user authorization within said enterprise resource planning environment (202); a plurality of indexes (204) adapted for hosting information pertaining to said enterprise resource planning environment (202); a search history repository (208) accessible through the integrated user interface (206) and communicatively coupled with the enterprise resource planning environment (202); a computer-usable medium embodying computer code, said computer-usable medium being coupled to said data bus, said computer program code comprising instructions executable by said processor and configured for operating a search query input module (302); a search query formation module (304); an information search module (306); an information extraction module (306); and an information display module (310).

In another embodiment of the present invention, the search query input module (302) is adapted for inputting user defined search query for information within the enterprise resource planning environment (202). The information is selected from a group comprising but not limited to a user, a group, a resource, an application, an entity, a solution interface, a workflow, a transaction and a document within the enterprise resource planning environment (202).

In another embodiment of the present invention, the search query formation module (304) is adapted for forming user defined search query by incorporating authorization information of the user therein. The user authorization information comprises of user authorization type within the enterprise resource planning environment (202). The user authorization type for searching and accessing information within the enterprise resource planning environment (202) is selected from a group comprising but not limited to individual user, user group, resource, application, entity, solution interface, workflow, transaction and document.

In another embodiment of the present invention, the information search module (306) is adapted for searching the plurality of indexes (204) for information using formed user defined search query and user authorization information within the enterprise resource planning environment (202). The user is enabled to filter information while searching and accessing information within the enterprise resource planning environment (202). The information filtration while searching and accessing information within the enterprise resource planning environment (202) is selected from a group comprising but not limited to pre search filtration and post search filtration.

In another embodiment of the present invention, the information extraction module (308) is adapted for extracting search results from the plurality of indexes (204) based on the user defined search query and user authorization information.

In another embodiment of the present invention, the information display module (310) is adapted for displaying the extracted search results along with a synopsis of the search results to the user based on user authorization.

In another embodiment of the present invention, further the user is enabled to search and access information within the enterprise resource planning environment (202), accessible through and communicatively coupled with the integrated user interface (206) in a single step.

In another embodiment of the present invention, the search history repository (208) accessible through the integrated user interface (206) and communicatively coupled with the enterprise resource planning environment (202) is adapted for storing searches history of the user and enabling extraction of searches history of the user and displaying the extracted searches history to the user through the integrated user interface (206) before searching and accessing information within the enterprise resource planning environment (202).

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer implemented method for searching and accessing information based on user authorization information within an enterprise resource planning (ERP) environment, the method comprising:
    inputting user defined search query for information within the enterprise resource planning environment, wherein the information is authorized to a user for searching and accessing the information based on an authorization key ingrained for the user;
    forming the user defined search query by incorporating the user authorization information;
    searching a plurality of indexes for information using formed user defined search query and the user authorization information within the enterprise resource planning environment, wherein the user authorization information comprises an authorization type of a user;
    filtering the information using formed user defined search query and the user authorization information within the enterprise resource planning environment, wherein the information filtration while searching and accessing the information within the enterprise resource planning environment is selected from at least one of pre search filtration and post search filtration;
    extracting search results from the plurality of indexes based on the user defined search query and the filtered user authorization information; and displaying the extracted search results along with a synopsis of the search results to the user based on user authorization.

2. The method as claimed in claim 1, wherein the authorization information is selected from a group comprising of a user, a group, a resource, an application, an entity, a solution interface, a workflow, a transaction and a document within the enterprise resource planning environment.

3. The method as claimed in claim 1, wherein the user authorization type for searching and accessing information within the enterprise resource planning environment is selected from a group comprising of individual user, user group, resource, application, entity, solution interface, workflow, transaction and document.

4. The method as claimed in claim 1, further comprises of enabling the user to search and access information within the enterprise resource planning environment, accessible through and communicatively coupled with the integrated user interface in a single step.

5. The method as claimed in claim 1, wherein the user is enabled to filter information while searching and accessing information within the enterprise resource planning environment.

6. The method as claimed in claim 5, wherein the information filtration while searching and accessing information within the enterprise resource planning environment is selected from a group comprising of pre search filtration and post search filtration.

7. The method as claimed in claim 1, further comprises of extracting searches history of the user stored in a search history repository accessible through the integrated user interface and communicatively coupled with the enterprise resource planning environment and displaying the extracted searches history to the user through the integrated user interface before searching and accessing information within the enterprise resource planning environment.

8. A system for searching and accessing information based on user authorization information, the system comprising:
   a processor;
   a data bus coupled to said processor;
   an enterprise resource planning (ERP) environment accessible through and communicatively coupled with an integrated user interface, enabling searching and accessing information based on the user authorization information within said enterprise resource planning environment;
   a plurality of indexes adapted for hosting information pertaining to said enterprise resource planning environment;
   a computer-usable medium embodying computer code, said computer-usable medium being coupled to said data bus, said computer program code comprising instructions executable by said processor and configured for operating:
      a search query input module adapted for inputting user defined search query for information within the enterprise resource planning environment, wherein the information is authorized to a user for searching and accessing the information based on an authorization key ingrained for the user;
      a search query formation module adapted for forming user defined search query by incorporating the user authorization information;
      an information search module adapted for searching the plurality of indexes for information using formed user defined search query and user authorization information within the enterprise resource planning environment, wherein the user authorization information comprises an authorization type of a user; and
      filtering the information using formed user defined search query and the user authorization information within the enterprise resource planning environment, wherein the information filtration while searching and accessing the information within the enterprise resource planning environment is selected from at least one of pre search filtration and post search filtration;
      an information extraction module adapted for extracting search results from the plurality of indexes based on the user defined search query and the filtered user authorization information; and
      an information display module adapted for displaying the extracted search results along with a synopsis of the search results to the user based on user authorization.

9. The system as claimed in claim 8, further comprises of a search history repository accessible through the integrated user interface and communicatively coupled with the enterprise resource planning environment, adapted for storing searches history of the user and enabling extraction of searches history of the user and displaying the extracted searches history to the user through the integrated user interface before searching and accessing information within the enterprise resource planning environment.

10. A non-transitory computer readable medium comprising program codes executable by at least one processor for a method for searching and accessing information based on a user authorization information within an enterprise resource planning (ERP) environment accessible through and communicatively coupled with an integrated user interface, the program codes comprising:
   a program code for inputting user defined search query for information within the enterprise resource planning environment, wherein the information is authorized to a user for searching and accessing the information based on an authorization key ingrained for the user;
   a program code for forming the user defined search query by incorporating the user authorization information;
   a program code for searching a plurality of indexes for information using formed user defined search query and the user authorization information within the enterprise resource planning environment, wherein the user authorization information comprises an authorization type of a user;
   a program code for filtering the information using formed user defined search query and the user authorization information within the enterprise resource planning environment, wherein the information filtration while searching and accessing the information within the enterprise resource planning environment is selected from at least one of pre search filtration and post search filtration;
   a program code for extracting search results from the plurality of indexes based on the user defined search query and the filtered user authorization information; and
   a program code for displaying the extracted search results along with a synopsis of the search results to the user based on user authorization.

* * * * *